US010082182B2

United States Patent
Lee et al.

(10) Patent No.: US 10,082,182 B2
(45) Date of Patent: Sep. 25, 2018

(54) CONSTANT-VELOCITY UNIVERSAL JOINT

(71) Applicant: erae AMS Co., Ltd., Daegu (KR)

(72) Inventors: Hyun-Il Lee, Daegu (KR); Jang-Sun Lee, Daegu (KR); Dong-Jin Kim, Daegu (KR); Jae-Seung Jeong, Daegu (KR)

(73) Assignee: erae AMS Co., Ltd., Daegu (KR)

( * ) Notice: Subject to any disclaimer, the term of this patent is extended or adjusted under 35 U.S.C. 154(b) by 88 days.

(21) Appl. No.: 15/021,229

(22) PCT Filed: Sep. 11, 2014

(86) PCT No.: PCT/KR2014/008469
§ 371 (c)(1),
(2) Date: Mar. 10, 2016

(87) PCT Pub. No.: WO2015/037915
PCT Pub. Date: Mar. 19, 2015

(65) Prior Publication Data
US 2016/0223027 A1 Aug. 4, 2016

(30) Foreign Application Priority Data

Sep. 11, 2013 (KR) .................. 10-2013-0109257

(51) Int. Cl.
*F16D 3/224* (2011.01)
*F16D 3/223* (2011.01)
*F16D 3/2237* (2011.01)

(52) U.S. Cl.
CPC ........... *F16D 3/223* (2013.01); *F16D 3/2237* (2013.01); *F16D 2003/22303* (2013.01); *F16D 2003/22309* (2013.01); *Y10S 464/906* (2013.01)

(58) Field of Classification Search
CPC ................... F16D 3/223; F16D 3/2237; F16D 2003/22303; F16D 2003/22309; Y10S 464/906
USPC ......................................... 464/145
See application file for complete search history.

(56) References Cited

U.S. PATENT DOCUMENTS 6,431,988 B1    8/2002  Tone
7,147,565 B2 *  12/2006 Nakagawa ............ F16D 3/2237
                                                   464/145

FOREIGN PATENT DOCUMENTS

| EP | 0802341 A1 | 10/1997 |
| EP | 1512879 A1 | 3/2005 |
| EP | 2594821 A2 | 5/2013 |
| JP | 2001-097063 A * | 4/2001 |

(Continued)

*Primary Examiner* — Greg Binda
(74) *Attorney, Agent, or Firm* — Novick, Kim & Lee, PLLC; Jae Youn Kim

(57) ABSTRACT

A constant-velocity universal joint includes: an outer joint member having a plurality of outer ball grooves; an inner joint member having a plurality of inner ball grooves; a plurality of torque transmitting balls; and a ball cage. The outer ball groove and the inner ball groove respectively have a double shape, and a ratio O/H of an offset value O which is a distance between an inflection point of the outer ball groove and a line connecting centers of the torque transmitting balls in a state that the outer joint member and the inner joint member form 0 angle and a distance H between a center line of the inner joint member and a center of the torque transmitting ball in a state that the outer joint member and the inner joint member form 0 angle is within a range of 0.07 to 0.11.

2 Claims, 2 Drawing Sheets

(56) References Cited

FOREIGN PATENT DOCUMENTS

| JP | 2012-021608 A | 2/2012 |
|----|---------------|--------|
| KR | 10-2000-0075495 A | 12/2000 |
| KR | 10-2007-0001934 A | 1/2007 |
| KR | 10-2013-0054012 A | 5/2013 |
| WO | 2011-149005 A1 | 12/2011 |

\* cited by examiner ball contact point

CONSTANT-VELOCITY UNIVERSAL JOINT

TECHNICAL FIELD

The present invention relates to a constant-velocity universal joint for vehicles.

BACKGROUND ART

A constant-velocity universal joint includes an outer joint member having outer ball grooves, an inner joint member having inner ball grooves, torque transmitting balls which are disposed to be guided respectively by a pair of the outer ball groove and the inner ball groove, and a ball cage containing the torque transmitting balls. Such a constant-velocity universal joint may be interposed between a transmission and a driving wheel to perform a function of transmitting torque.

The ball grooves of the constant-velocity universal joint may be formed by joining portions having different shapes so as to have double shapes and to have a high articulation angle (e.g., more than 50 degrees).

In a conventional constant-velocity universal joint of high-articulation angle, a ratio O/H of an offset value O which is a distance between an inflection point of an outer ball groove and a line connecting centers of the torque transmitting balls in a state that an outer joint member and an inner joint member form 0 angle and a distance H between a center line of an inner joint member and a center of a ball in a state that an outer joint member and an inner joint member form 0 angle is generally within a range of 0.13 to 0.15.

However, in a constant-velocity universal joint of high-articulation angle, a joint having the value of the ratio O/H within this range has a great power loss.

DETAILED DESCRIPTION OF THE INVENTION

Technical Problem

The present invention has been made in an effort to provide a constant-velocity universal joint of a high-articulation angle which can reduce a power loss through the optimization of the above-described ratio O/H.

Technical Solution

A constant-velocity universal joint according to an exemplary embodiment of the present invention includes: an outer joint member having a plurality of outer ball grooves; an inner joint member having a plurality of inner ball grooves respectively corresponding to the plurality of the outer ball grooves; a plurality of torque transmitting balls which are respectively guided by a pair of the outer ball groove and the inner ball groove; and a ball cage containing the plurality of the torque transmitting balls. The outer ball groove and the inner ball groove respectively have a double shape which is formed by a connection of different shapes, and a ratio O/H of an offset value O which is a distance between an inflection point of the outer ball groove and a line connecting centers of the torque transmitting balls in a state that the outer joint member and the inner joint member form 0 angle and a distance H between a center line of the inner joint member and a center of the torque transmitting ball in a state that the outer joint member and the inner joint member form 0 angle is within a range of 0.07 to 0.11.

The ball cage may be formed such that a contact point contacting the torque transmitting ball is positioned at a point between ⅛ and 1/12 from an inner end to an outer end of a contacting surface The inner joint member may be formed to be able to be articulated more than 50 degrees with respect to the outer joint member.

The inflection point may be offset toward an open side of the outer joint member from a line connecting centers of the torque transmitting balls.

Advantageous Effects

According to the present invention, by suitably regulating a ratio O/H of an offset value O which is a distance between an inflection point of the outer ball groove and a line connecting centers of the torque transmitting balls in a state that the outer joint member and the inner joint member form 0 angle and a distance H between a center line of the inner joint member and a center of the torque transmitting ball in a state that the outer joint member and the inner joint member form 0 angle, the power transmission efficiency can be enhanced and at the same time the locking can be prevented.

DESCRIPTION OF REFERENCE NUMERALS

Figure 1:
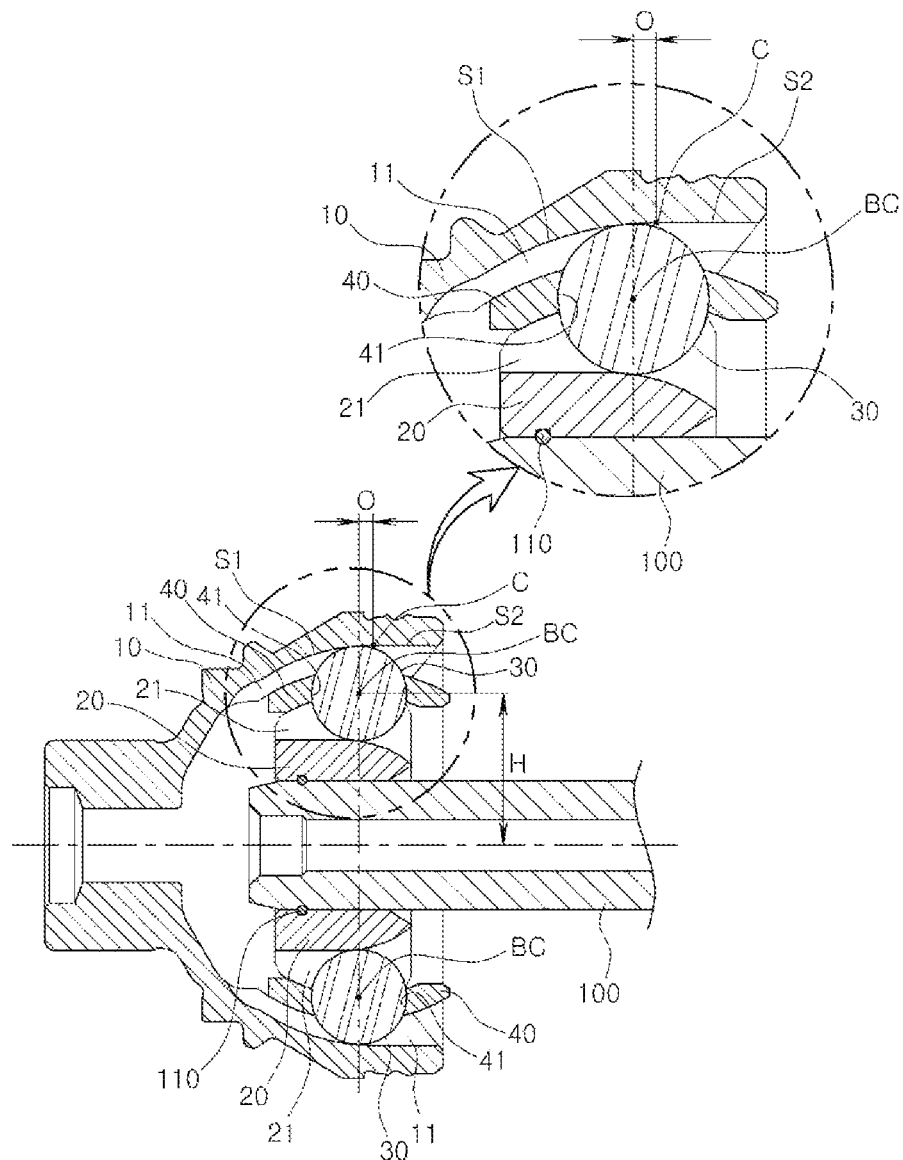
FIG. 1 is a schematic sectional view of a constant-velocity universal joint according to an embodiment of the present invention.

10: outer joint member
11: outer ball groove
20: inner joint member
21: inner ball groove
30: torque transmitting ball
40: ball cage

[Best Mode]

Embodiments of the present invention will be described referring to the accompanying drawings in detail hereinafter.

A constant-velocity universal joint according to an embodiment of the present invention includes an outer joint member 10 and an inner joint member 20. The constant-velocity universal joint may perform a function of transmitting power of a transmission to a driving wheel, and the outer joint member 10 may be connected to a driving wheel and the inner joint member 20 may be connected to a transmission via a connecting shaft 100. At this time, the inner joint member 20 is connected to the connecting shaft 100 so as to rotate therewith, and a fixing ring 110 may be interposed between the inner joint member 20 and the connecting shaft 100 for the fixing along a shaft direction.

The constant-velocity universal joint according to an embodiment of the present invention may be a constant-velocity universal joint with a high articulation angle (e.g., more than 50 degrees) between the outer joint member 10 and the inner joint member 20.

The outer joint member 10 may have a shape in which one side thereof are opened so as to receive the inner joint member 20, and the inner joint member 20 is disposed within the outer joint member 10 in a state of being rotatable in a predetermined angle.

A plurality of outer ball grooves 11 are formed on an inner surface of the outer joint member 10 in a circumferential direction, and a plurality of inner ball grooves 21 are formed on an outer surface of the inner joint member 20 in a circumferential direction.

A plurality of torque transmitting balls 30 are respectively disposed so as to be guided by a pair of the outer ball groove 11 and the inner ball groove 21. That is, the outer ball groove 11 and the inner ball groove 21 cooperatively operate as a pair, and cooperatively receive the torque transmitting ball 30. Accordingly, the respective torque transmitting ball 30 is disposed in a space formed by a pair of the outer ball groove 11 and the inner ball groove 21 to be movable in a predetermined range to perform a torque transmitting function.

The torque transmitting ball 30 is contained in a ball cage 40. The ball cage includes a plurality of windows 41 for containing the plurality of torque transmitting balls 30. The ball cage 40 is interposed between the outer joint member 10 and the inner joint member 10 and may have a ring shape generally, and the respective window 41 may be formed by being perforated in a radial direction.

The outer ball groove 11 and the inner ball groove 21 are respectively formed by a connection of two different shapes so as to have a double shape. That is, the outer ball groove 11 includes a portion S1 having a first shape and a portion S2 having a second shape which is different from the first shape, and similarly the inner ball groove 21 is formed by a combination of two portions having different shapes so as to have a double shape. At this time, the arrangement of the two portions having different shapes of the inner ball groove 21 is opposite to that of the outer ball groove 11.

According to an embodiment of the present invention, a ratio O/H of an offset value O which is a distance between an inflection point C of the outer ball groove 11 and a line connecting centers BC of the torque transmitting balls 30 in a state that the outer joint member 10 and the inner joint member 20 form 0 angle and a distance H between a center line of the inner joint member 20 and a center of the torque transmitting ball 30 in a state that the outer joint member 10 and the inner joint member 20 form 0 angle (i.e., the state shown in FIG. 1) is within a range of 0.07 to 0.11. Here, the inflection point C means a point where the two portions S1 and S2 having different shapes meet.

At this time, as shown in FIG. 1, the inflection point C may be offset toward an open side (the right side in FIG. 1) of the outer joint member 10 from a line connecting the centers of the torque transmitting balls 30. With this offset direction, a linear portion of the outer joint member 10 may be widened less as it goes to the open side compared to the opposite offset direction, the dimensional size of the outer circumference of the outer joint member 10 can be decreased, and accordingly the weight and the size of the total package can be reduced. In addition, if the ball groove of the outer joint member 10 is widened more as it goes to the open side, the thickness of the ball cage 40 for restricting the torque transmitting balls should increases more, and the height of a portion which supports the torque transmitting ball decreases so that the ball groove may be crushed, however these problems may be prevented by the offset direction of the embodiment of the present invention.

As such, according to an embodiment of the present invention, the ratio O/H of the two values is within the range of 0.07 to 0.11, and the lower bound 0.07 is a minimum value for preventing locking in consideration of a dimension clearance (approximately 20 µm) for manufacturing and assembling of the product, and the upper bound 0.11 is a value for achieving an increase of an efficiency of about 5% than the conventional offset ratio (approximately 0.13 to 0.15). As such, an embodiment of the present invention is based on discovering the fact that the torque transmitting efficiency varies depending on a ratio O/H of an offset value O which is a distance between an inflection point C of the outer ball groove 11 and a line connecting centers BC of the torque transmitting balls 30 in a state that the outer joint member 10 and the inner joint member 20 form 0 angle and a distance H between a center line of the inner joint member 20 and a center of the torque transmitting ball 30 in a state that the outer joint member 10 and the inner joint member 20 form 0 angle, and this ratio is optimally set to select the range in which the torque transmitting efficiency can be increased and the locking can be prevented.

Figure 2:
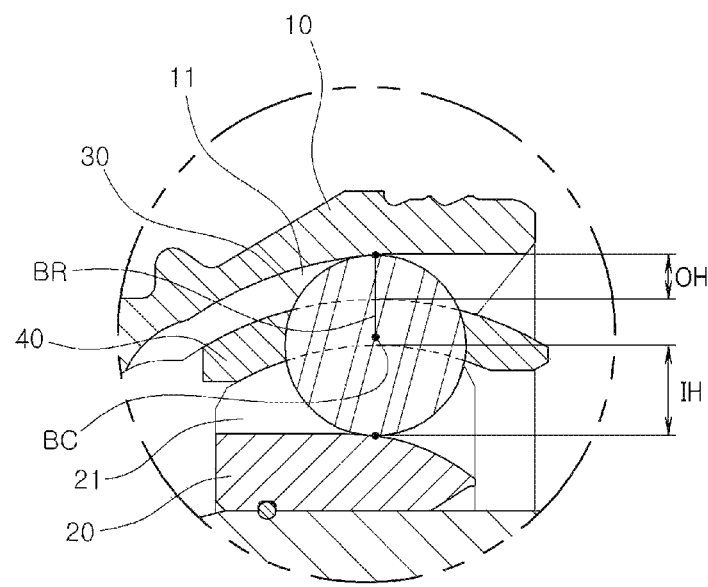
FIG. 2 is a drawing for explaining the relation of sizes of a ball groove and a ball of a constant-velocity universal joint according to an embodiment of the present invention.

Meanwhile, according to an embodiment of the present invention, referring to FIG. 2, the heights OH and IH of the side ends of the outer ball groove 11 and the inner ball groove 21 which restrict the torque transmitting ball 30 may be more than ⅔ of the radius BR of the torque transmitting ball 30. The reason of this is that a margin outside the contacting point of the ball can exist so as to prevent a deformation of the groove due to the torque transmitting ball 30 when a load acts in a contacting angle of 30 to 40 degrees of the torque transmitting ball 30.

Figure 3:
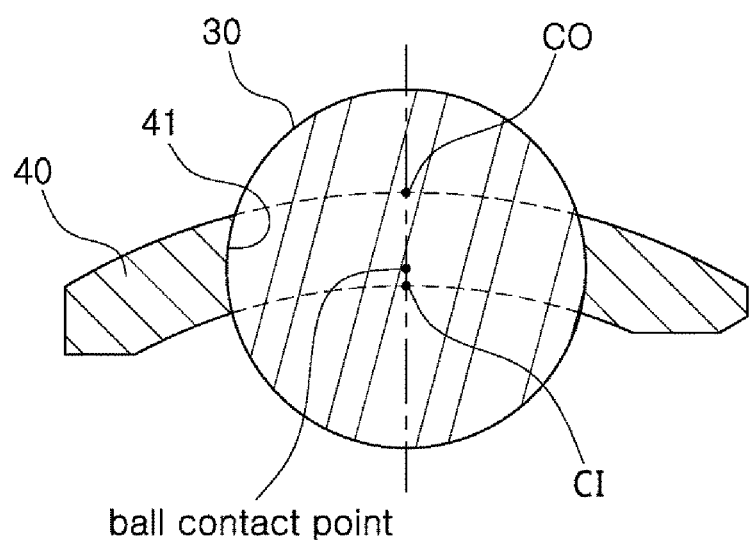
FIG. 3 is a drawing for explaining contact of a ball groove and a ball of a constant-velocity universal joint according to an embodiment of the present invention.

Meanwhile, referring to FIG. 3, the ball cage 40 may be formed such that a contact point contacting the torque transmitting ball 30 may be positioned at a point between ⅛ and 1/12 from an inner end CI to an outer end CO of a contacting surface. That is, in FIG. 3, a distance between the inner end CI of the contacting surface of the ball cage 40 and the ball contacting point is ⅛ to 1/12 of a distance of the inner end CI and the outer end CO of the contacting surface of the ball cage 40. Further, according to an embodiment of the present invention, a circumferential space for the ball cage 40 may be 1.2 to 1.4 times of the total rotational direction of the torque transmitting ball 30. In real operation, in an articulation angle of 0 to 50 degrees, the torque transmitting ball 30 moves in an 8-shape of an improper fraction, and in order to achieve an articulation of 50 degrees it is designed that the contact (at 0 degree) of the ball cage 40 and the torque transmitting ball 30 is downwardly. Due to these values a high articulation angle can be achieved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a constant-velocity joint and can be applied to a part of a vehicle, so it has an industrial applicability.

The invention claimed is:
1. A constant-velocity universal joint comprising:
an outer joint member having a plurality of outer ball grooves;
an inner joint member having a plurality of inner ball grooves respectively corresponding to the plurality of the outer ball grooves;

a plurality of torque transmitting balls respectively guided by a pair of the outer ball groove and the inner ball groove; and a ball cage having a plurality of windows respectively containing the plurality of the torque transmitting balls, wherein the outer ball groove and the inner ball groove respectively have a double shape formed by a connection of different shapes, wherein a ratio O/H of an offset value, wherein O is a distance between an inflection point of the outer ball groove and a line connecting centers of the torque transmitting balls in a state that the outer joint member and the inner joint member form 0 angle and H is a distance between a center line of the inner joint member and a center of the respective torque transmitting ball in a state that the outer joint member and the inner joint member form 0 angle, is within a range of 0.07 to 0.11, and wherein the inflection point is offset toward an open side of the outer joint member from the line connecting centers of the torque transmitting balls, and wherein the ball cage is formed such that a contact point of an inner surface of the respective window of the ball cage and the respective torque transmitting ball is positioned at a point between $\frac{1}{8}$ and $\frac{1}{12}$ from an inner end to an outer end of a contacting surface of the respective window in a state that the outer joint member and the inner joint member form an angle of zero.

2. The constant-velocity universal joint of claim 1, wherein the inner joint member is configured to be articulated more than 50 degrees with respect to the outer joint member.

* * * * *